(12) United States Patent
Mathai et al.

(10) Patent No.: US 8,056,297 B2
(45) Date of Patent: Nov. 15, 2011

(54) FLANGELESS WIND TOWER

(75) Inventors: Manu Mathai, Tamil Nadu (IN);
Ronald R. Cairo, Greer, SC (US);
Sujith Sathian, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/237,919

(22) Filed: Sep. 25, 2008

(65) Prior Publication Data
US 2010/0071275 A1 Mar. 25, 2010

(51) Int. Cl.
*E04H 12/00* (2006.01)
(52) U.S. Cl. ............... 52/651.01; 52/651.07; 52/834; 52/848; 52/301; 403/292
(58) Field of Classification Search ......... 52/651.01, 52/651.07, 834, 848, 301; 403/292, 293, 403/336
See application file for complete search history.

(56) References Cited

U.S. PATENT DOCUMENTS

| | | | | |
|---|---|---|---|---|
| 208,004 A * | 9/1878 | Withers | ............ | 256/32 |
| 295,905 A * | 4/1884 | Brott | ............ | 52/834 |
| 637,420 A * | 11/1899 | Robbins | ............ | 52/651.01 |
| 865,179 A * | 9/1907 | Hays | ............ | 52/834 |
| 2,409,060 A * | 10/1946 | Moore | ............ | 52/651.07 |
| 3,564,804 A * | 2/1971 | Archer et al. | ............ | 2/745.17 |
| 3,793,794 A * | 2/1974 | Archer et al. | ............ | 52/632 |
| 3,818,671 A * | 6/1974 | Matsushita et al. | ............ | 52/638 |
| 4,259,821 A * | 4/1981 | Bush | ............ | 52/309.1 |
| 4,934,114 A * | 6/1990 | Lindsey | ............ | 52/40 |
| 4,949,525 A * | 8/1990 | Weaver | ............ | 40/606.14 |
| 4,986,687 A * | 1/1991 | Ivey | ............ | 403/2 |
| 5,012,622 A * | 5/1991 | Sato et al. | ............ | 52/834 |
| 5,333,436 A * | 8/1994 | Noble | ............ | 52/849 |
| 6,408,575 B1 * | 6/2002 | Yoshida et al. | ............ | 52/40 |
| 6,532,700 B1 * | 3/2003 | Maliszewski et al. | ............ | 52/40 |
| 6,857,808 B1 * | 2/2005 | Sugimoto et al. | ............ | 403/41 |
| 6,907,706 B1 * | 6/2005 | Schippmann et al. | ............ | 52/848 |
| 6,955,025 B2 * | 10/2005 | Dehlsen et al. | ............ | 52/745.17 |
| 6,957,518 B1 * | 10/2005 | Koch, Jr. | ............ | 52/849 |
| 7,116,282 B2 * | 10/2006 | Trankina | ............ | 52/845 |
| 7,464,512 B1 * | 12/2008 | Perina | ............ | 52/651.01 |
| 2002/0170261 A1 * | 11/2002 | Brunozzi et al. | ............ | 52/721.4 |
| 2002/0170264 A1 * | 11/2002 | Koszo | ............ | 52/737.4 |
| 2002/0184833 A1 * | 12/2002 | Jones | ............ | 52/40 |
| 2006/0236648 A1 * | 10/2006 | Grundman et al. | ............ | 52/726.4 |
| 2007/0256388 A1 * | 11/2007 | Ianello et al. | ............ | 52/651.07 |
| 2008/0041009 A1 * | 2/2008 | Cairo et al. | ............ | 52/651.07 |
| 2008/0166231 A1 * | 7/2008 | Bagepalli | ............ | 415/215.1 |
| 2008/0250752 A1 * | 10/2008 | Bowman et al. | ............ | 52/848 |
| 2009/0016897 A1 * | 1/2009 | Olgaard | ............ | 416/244 R |
| 2009/0223163 A1 * | 9/2009 | Quek et al. | ............ | 52/651.01 |

\* cited by examiner

*Primary Examiner* — Brian Glessner
*Assistant Examiner* — Joshua Ihezie
(74) *Attorney, Agent, or Firm* — Dority & Manning, P.A.

(57) ABSTRACT

A method for stiffening a wind turbine tower employing fingerplate assemblies on flangeless joints between adjacent tubular tower sections. The method includes limiting the intercan gap between adjacent end surfaces of the tower sections at the flangeless joints and selecting a number of fingerplates to fasten each flangeless joints to limit distortion. Establishing dimensions for the fingerplates may further minimize localized tower distortion. Selecting a material for the fingerplate with a lower Young's modulus than a material for the tubular section also results in reduced localized tower distortion. Attaching a coverplate to a top tubular section limits tip displacement for the tower.

17 Claims, 9 Drawing Sheets

FLANGELESS WIND TOWER

BACKGROUND OF THE INVENTION

The invention relates generally to wind towers and more specifically to the design of flangeless wind towers.

Wind Turbine towers are frequently constructed of multiple units of tubular cross-section components. Tubular support structures have many and varied types of application. Some types of support structures exist where equipment is supported at elevated heights from the ground. These multi-section support structures may be tall and carry operating equipment of various weights at the top, thereby subjecting the joints between the multiple sections in these structures to high stress. The tubular, multi-section support structures may be used in many applications, including cellular phone towers, radar towers, and wind towers.

Wind turbine support towers are large structures, sometimes extending to significant heights to accommodate large wind turbine rotor blades and to strategically place the rotor blades within a wind path. For example, a typical tower may have a height as high as about 100 meters (m). Such a tower may include multiple sections, often a bottom, a middle and a top section. The length and number of individual sections may vary according to the application and height of the structure. The cross section for many such towers is generally circular and may be tapered at upper levels. Tapering may be achieved by use of individual tubular segments, the tubular segments tapered as right conical sections along an axial, vertical, direction.

Mounted on top of the support tower for wind turbines is a nacelle. The nacelle houses, or encloses, the equipment and components of the wind turbine and includes hubs for the wind turbine blades and the power train including the bearing, gearbox and electrical generator for the wind turbine. Typically, a yaw bearing is mounted to the top section of the tower. A bed plate supporting all of the weight of the power train rotates on the yaw beating, allowing wind turbine controls to rotate the nacelle to better position the blades wind respect to the wind direction for optimizing performance.

Certain prior art tubular wind turbine structures were fabricated with tubular sections of welded segment assemblies with flanges welded on the ends of the tubular sections. A top closure flange and a bottom closure flange of adjacent sections are then bolted together along a bolt line to assemble the sections together. On-going problems with the exemplary wind turbine support tower include weld cracking, buckling of the tower wall, loosing fastener pre-load, maintenance requirement, flange distortion and bolt failure during tower flexure, each contributing to the life cycle cost of the tower. Moreover, the heat generated during the flange welding process distorts the flanges out of their bolting plane creating joining issues that include excessive bolt preload and weld residual stress.

Figure 1:
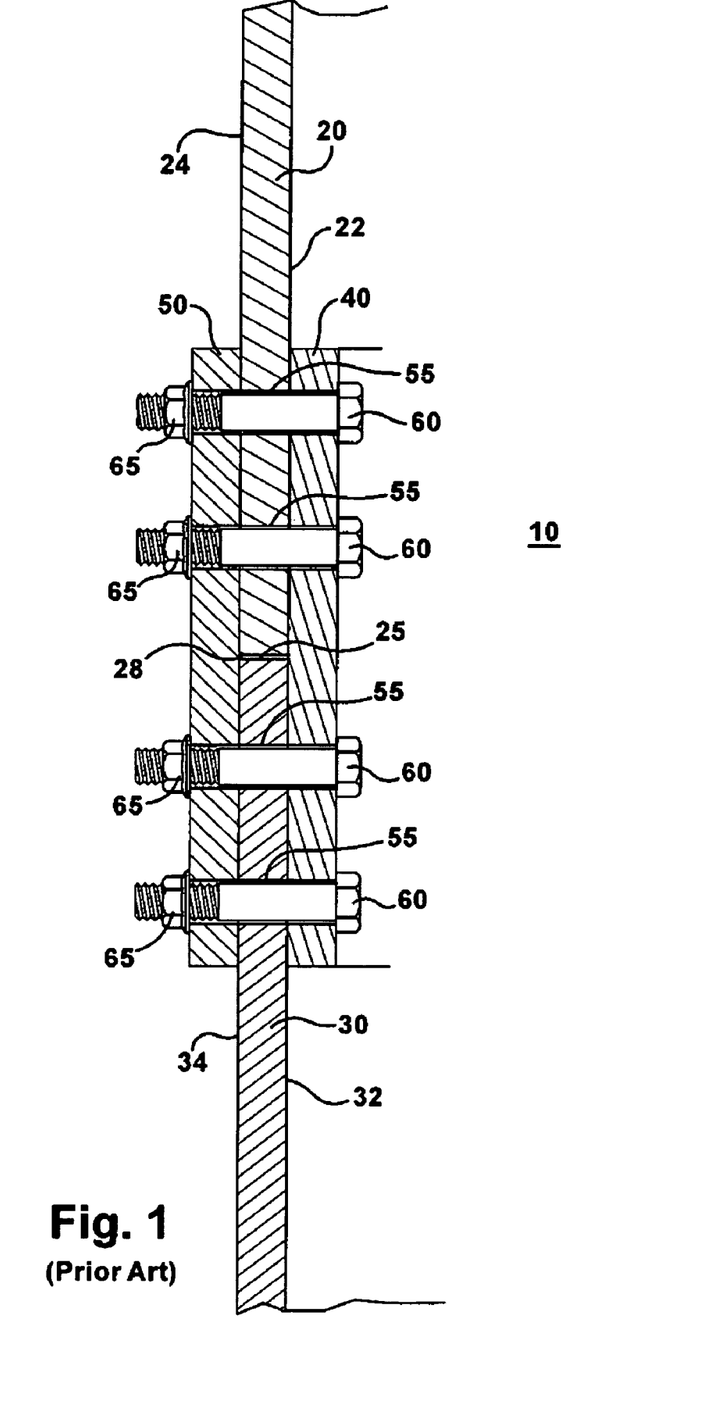
FIG. 1 illustrates a side sectional view of an fingerplate assembly.
Figure 2:
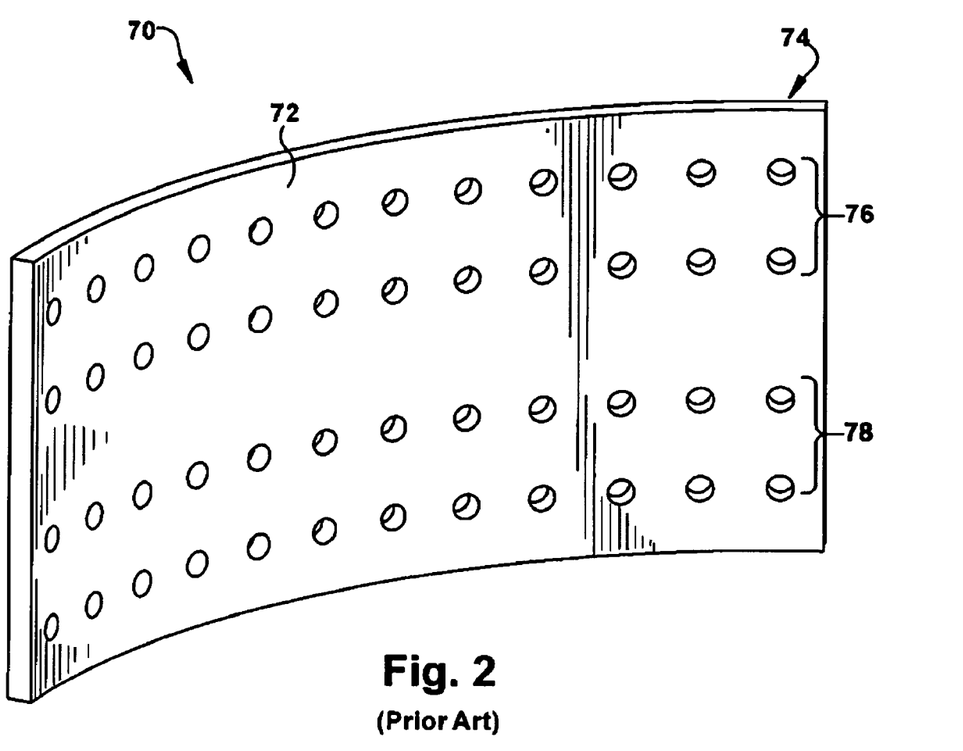
FIG. 2 illustrates an isometric view of a typical fingerplate.
Figure 3:
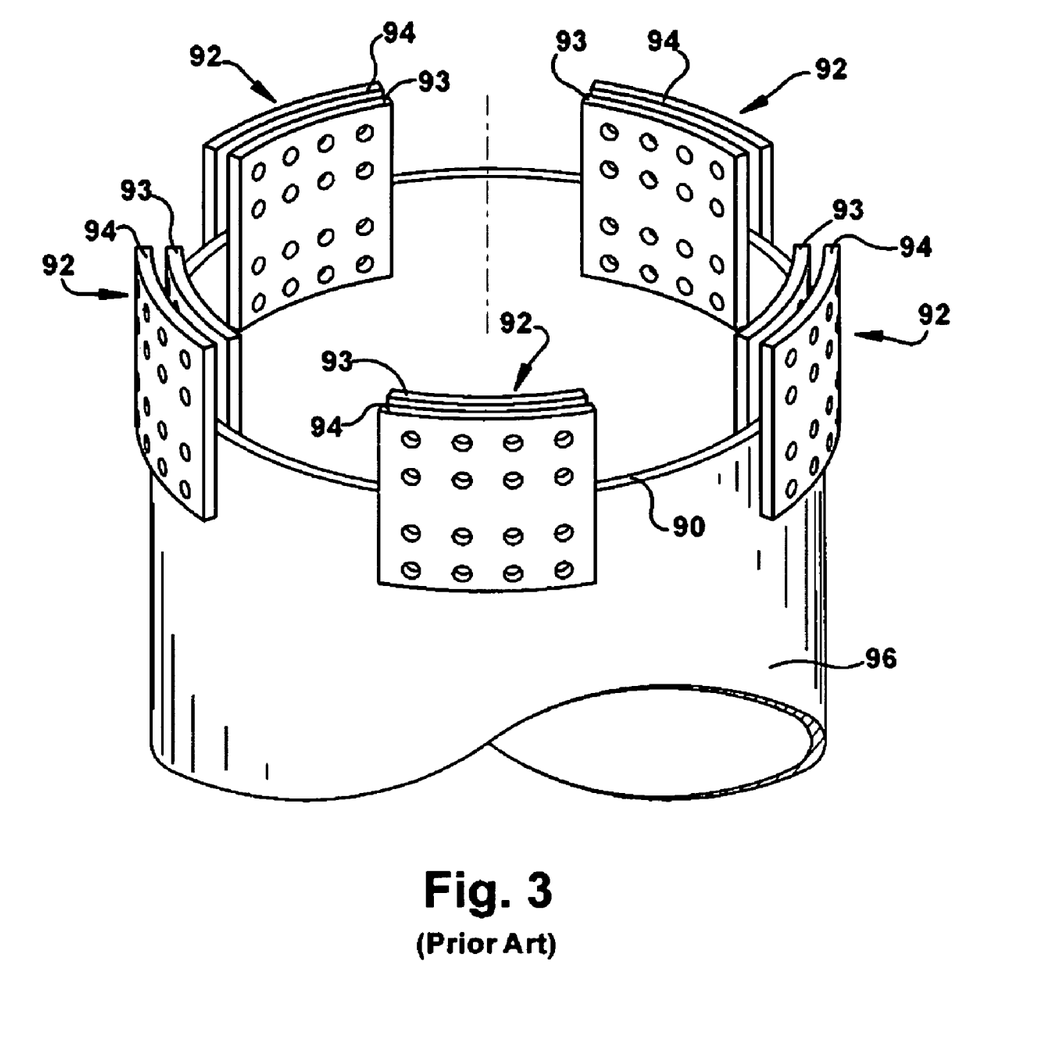
FIG. 3 illustrates the flangeless joint utilizing fingerplate assemblies uniformly distributed around the periphery of a tubular support structure.

U.S. Publication 2008/0041009 A1, dated Feb. 21, 2008 by Cairo et al., discloses a flangeless wind turbine tower to replace the common welded flange wind tower design and is illustrated in FIGS. 1-3. In the flangeless design, fingerplate assemblies are used to replace welded flanges on the tubular sections as the means of joining the tubular sections of the tower to build up the full height of the tower. The flangeless concept and subsequent bolted fingerplate assembly eliminates the above-described problems such as weld cracking, tower wall buckling, loosing fastener pre-load, maintenance requirement, flange distortion and bolt failure during tower flexure. The flanged tower sections undergo distortion during service loading in addition to the post-weld distortion. Thus a flangeless wind turbine tower design, incorporating fingerplates, was presented, eliminating the drawbacks of flanged wind towers. With the current wind tower flange fastening method, the type of loading is tensile, whereas with the finger plate design loading is shear mode. A friction connection (finger plate design) is the most fatigue resistant type of connection used in steel construction today. This fastening method has the advantage that once the bolt is tensioned, it never sees additional load. The bolt merely provides the normal force required for the friction between the plates to work.

FIG. 1 illustrates a side sectional view of a fingerplate assembly 10 for tubular assemblies that overcome the previously described problems, in tubular assemblies with welded flanged joints, of flange distortion after welding. The annular rings forming the end surfaces of two adjacent flangeless tubular sections 20 and 30 of the tubular assembly (without flanges) are brought together in close proximity at point 25. A space 28 between the adjacent tubular sections 20, 30 is referred to as an intercan gap. An inner fingerplate 40 is provided on an interior of the fingerplate assembly 10. The inner fingerplate 40 may be provided with a curved outer diameter matched to the curved inner diameter of the flangeless tubular sections 20 and 30. The inner fingerplate 40 is provided for connecting the inner surfaces 22 and 32 of the adjacent flangeless tubular sections 20, 30. An outer fingerplate 50 is provided on an exterior of the fingerplate assembly 10 for connecting with outer surfaces 24, 34 of the adjacent flangeless tubular sections 20, 30. The outer fingerplate 50 may be provided with a curved inner diameter matched to the curved outer diameter of the tubular sections 20 and 30. The outer fingerplate 50 is provided for connecting the outer surfaces 24 and 34 of the adjacent flangeless tubular sections 20, 30. Fastening arrays of throughholes 55 are provided on each fingerplate 40, 50 and are matched with the fastening array of throughholes 55 provided on the corresponding adjacent ends of the flangeless tubular sections 20, 30. The assembly further may further include bolts 60 and nuts 65 according to the throughhole array. However, other suitable fastening means may be utilized depending upon the particular application.

FIG. 2 illustrates an isometric view of a typical fingerplate utilizing nut and bolt fastening. The typical fingerplate 70 has an inner surface 72 and an outer surface 74. For an inner fingerplate, its outer surface is matched to the curved outer surface of the adjacent tubular sections. For an outer fingerplate, its inner surface matched to corresponding surface of adjacent tubular sections. A typical bolt throughhole array 76 is shown for connection with one tubular section and typical bolt throughhole array 78 is shown for connection with the adjacent tubular section. Fingerplate design is according to standard design practice including spacing of bolt throughholes from the edge of the fingerplate, spacing between adjacent bolt throughholes, thickness of the fingerplate, surface dimension of the fingerplate and plate material selection.

FIG. 3 illustrates a flangeless joint 90 with fingerplate assemblies 92 uniformly distributed around the periphery of a lower tubular section 96. The inner fingerplates 93 and outer fingerplates 94 and the lower tubular section 96 are shown for clarity. An tipper tubular section and fasteners are omitted for the sake of clarity. For an exemplary wind turbine support tower of about 80 m, five fingerplate assemblies may be distributed around the periphery of the adjacent sections of the wind turbine support tower. Further bolting may be employed as a fastening means for the wind turbine support tower.

A simplified representation of a scheme for bolting throughholes is shown in FIG. 3. FIG. 2 illustrates a fingerplate with a more typical throughhole array for the exemplary wind turbine support tower. For an exemplary 80 m tower, the fingerplate may have an arc dimension of about 2 m. a height of about 1 m, and a thickness of about 20 mm. The material for fingerplates may preferably include ASTM A 572 Gr 50 steel plate. Bolt throughhole arrays 76 and 78 on the fingerplates may be preferably configured in double rows applied to each adjacent section of tower for a total of about 48 boltholes per fingerplate. Diameter for the bolt throughholes may preferably be sized about 1.25 inch. Minimum spacing between the bolt throughholes may be about 5 inches. Typical bolts for the fingerplates in the 80 m tower may preferably be M36 10.9 grade bolts that are torqued to a bolt prestress of about 510 MPa (74 ksi).

While the flangeless windtower eliminated the adverse performance of the flanged wind tower, as previously described, further analysis of the flangeless wind tower concept suggests that the overall stiffness of the flangeless tower with fingerplates was low. The stiffness of the flangeless windtower could be as low as one-tenth that of the flanged tower. Low stiffness can lead to excessive tower sway, resulting in high compressive forces on tower sections and fingerplates at the joints. The high compressive forces can lead to unacceptable distortion of the tower sections and fingerplates at the joint, potentially resulting in local failure or overall structural instability due to compression induced buckling.

Accordingly, there is a need to address elements of a flangeless wind turbine tower arrangements to improve the stiffness to be comparable with the baseline flanged wind tower that it replaced.

BRIEF DESCRIPTION OF THE INVENTION

The present invention relates to in general to a flangeless wind tower structure and method for providing stiffness to the structure.

Briefly, in accordance with one aspect of the invention, a wind turbine tower is provided. The wind turbine tower includes a plurality of tubular sections, wherein each tubular section includes substantially planar end surfaces. A plurality of flangeless joints are formed where each individual flangeless joint is arranged between opposing end surfaces of adjacent tubular sections. Fingerplate assemblies are uniformly distributed around a periphery of each flangeless joint where each fingerplate includes a circumferential angle (defining the arc width of the finger plate), a longitudinal dimension, and a radial thickness. Means are provided for stiffening the wind turbine tower against lateral sway.

In accordance with another aspect of the present invention, a method, is provided for stiffening a wind turbine tower employing fingerplate assemblies on plurality of flangeless joints between a plurality adjacent tubular sections with substantially planar end surfaces. The method includes limiting the intercan gap between adjacent end surfaces of the plurality tower sections at the flangeless joints joined by fingerplate assemblies. The method further includes selecting a number of fingerplates to fasten each joint of the plurality of flangeless joints and establishing a circumferential angle, a longitudinal length and a radial thickness for a fingerplate of the fingerplate assembly. Additionally a selection is made for a material with a Young's modulus for the fingerplate to be lower than a Young's modulus for a material of the tubular section. The method also provides for attaching a coverplate adapted for stiffening the wind tower to an upper end of a top tubular section with provision for subsequent attachment to the gimbal bearing at the base of the bedplate in the nacelle.

Briefly, in accordance with a third aspect of the present invention, a wind turbine tower is provided. The wind turbine tower includes a plurality of tubular sections. Each tubular section includes substantially planar end surfaces forming a controlled intercan gap between adjacent tubular sections. Flangeless joints are formed between opposing end surfaces of adjacent tubular sections, including three fingerplate assemblies uniformly distributed around a periphery of each flangeless joint. Each fingerplate assembly includes a circumferential angle, a longitudinal length and a radial thickness optimized for tower stiffness. The fingerplate assemblies include a material with a Young's modulus for the fingerplate to be lower than a Young's modulus for a material of the tubular section. A coverplate is attached to a top tubular section of the windtower. The coverplate includes a material with a high Young's modulus relative to the Young's modulus for a material of the fingerplates.

BRIEF DESCRIPTION OF THE DRAWING

These and other features, aspects, and advantages of the present invention will become better understood when the following detailed description is read with reference to the accompanying drawings in which like characters represent like pails throughout the drawings, wherein.

DETAILED DESCRIPTION OF THE INVENTION

The following embodiments of the present invention have many advantages, including stiffening a flangeless wind turbine tower and avoidance of high tensile stresses on tubular sections and fingerplates at the flangeless joints.

The flangeless wind turbine tower presented in U.S. patent application Ser. No. 11,506,421 by Cairo et al., dated Aug. 18, 2006 gives a stiffness which can be much lower compared to the baseline flanged wind tower design. The present invention establishes design features and numerous design methodologies that improve the stiffness of the flangeless wind tower assembly and makes the stiffness comparable to the baseline flanged wind tower case of Cairo et al., which has displayed satisfactory stiffness by analysis and in the field performance of assembled towers. The baseline tower structure for the flanged arrangements may comprise 3 tower sections, where each tower section included a plurality of cans welded, end-to-end. The tower sections formed an overall height of about 80 m., with two joints between sections. The flangeless wind turbine tower of Cairo et al. required five fingerplate assemblies distributed around the periphery of the adjacent sections for each joint.

The innovative methods can optimize and thereby reduce the number of fingerplates around the wind tower. Improving the stiffness of the tower enables the number of fingerplates to be reduced substantially for each joint between tubular sections from 5 to 3. Therefore with an optimized design for 3 sections with two joints, the number of fingerplates can be brought down from 10 to 6 thereby also generating in considerable material savings and direct material productivity. This is in addition to the benefits previously described of not having to re-weld conventional welded flanges that have distorted due to the heat of welding beyond the level required for assembly of the mating tower sections and not having tower sections with pre-stresses that limit the level of service induced stress capability.

Figure 4:
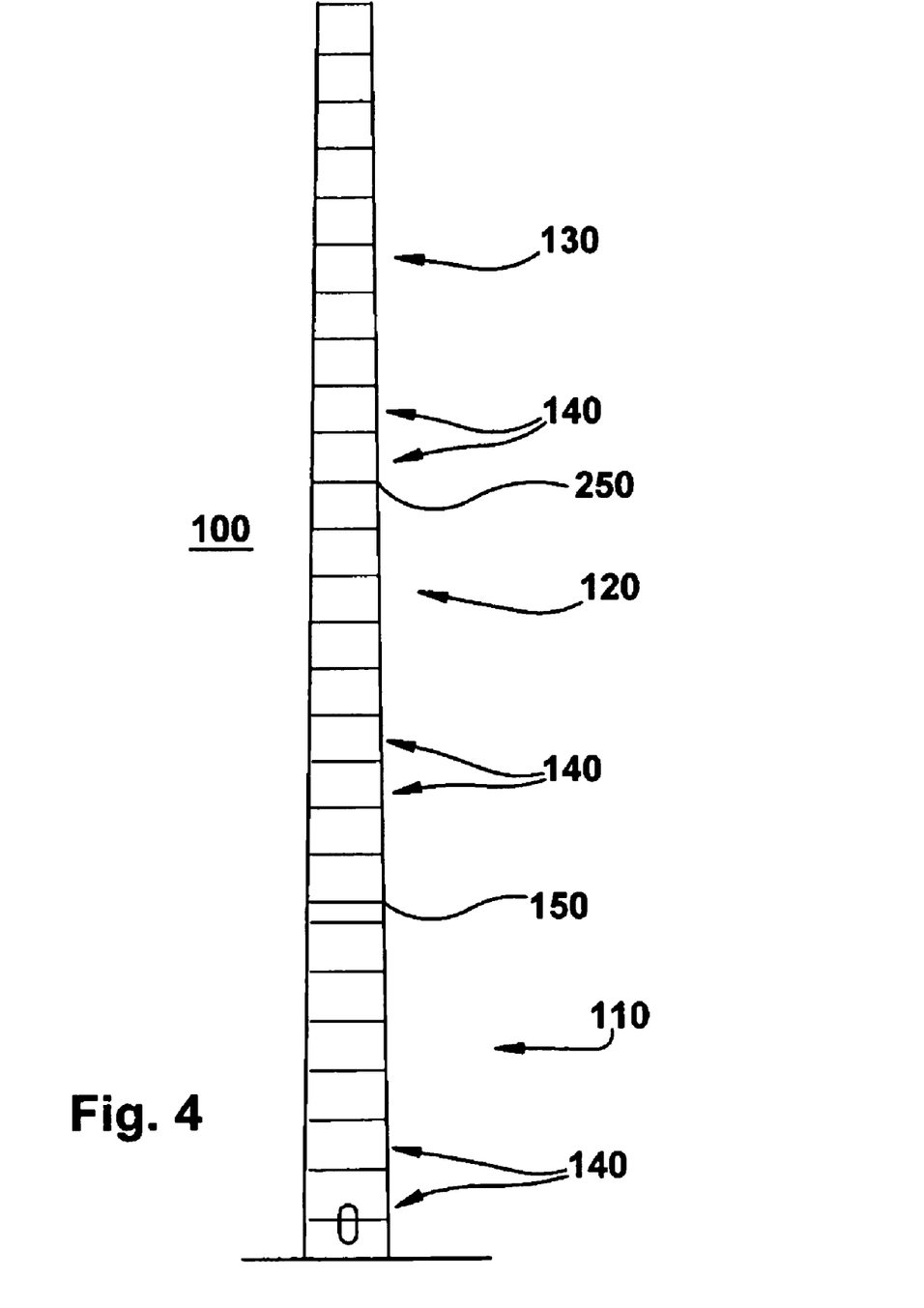
FIG. 4 illustrates a baseline tower arrangement used for comparison of stiffness between a flanged arrangement and a modified flangeless fingerplate arrangement.

Analysis was carried out to estimate the optimal design of the fingerplate joints in relation to a wind tower as generally described in Cairo et al. for a three section tower of about 80 meters. including a base section of 8 cans and a length of about 22 meters; a mid-section of with 8 cans and a length of about 26 meters; and a top section with 10 cans and a length of about 30 meters, as illustrated in FIG. 4. The baseline tower includes a diameter of 4300 mm and thickness of 10 mm; a bottom and top can length of 2000 mm; twelve bolt holes in the circumferential direction with a bolt hole pitch in a longitudinal direction of 200 mm; a fingerplate thickness of 20 mm; and fingerplate longitudinal dimension of 1000 mm.

Figure 5A:
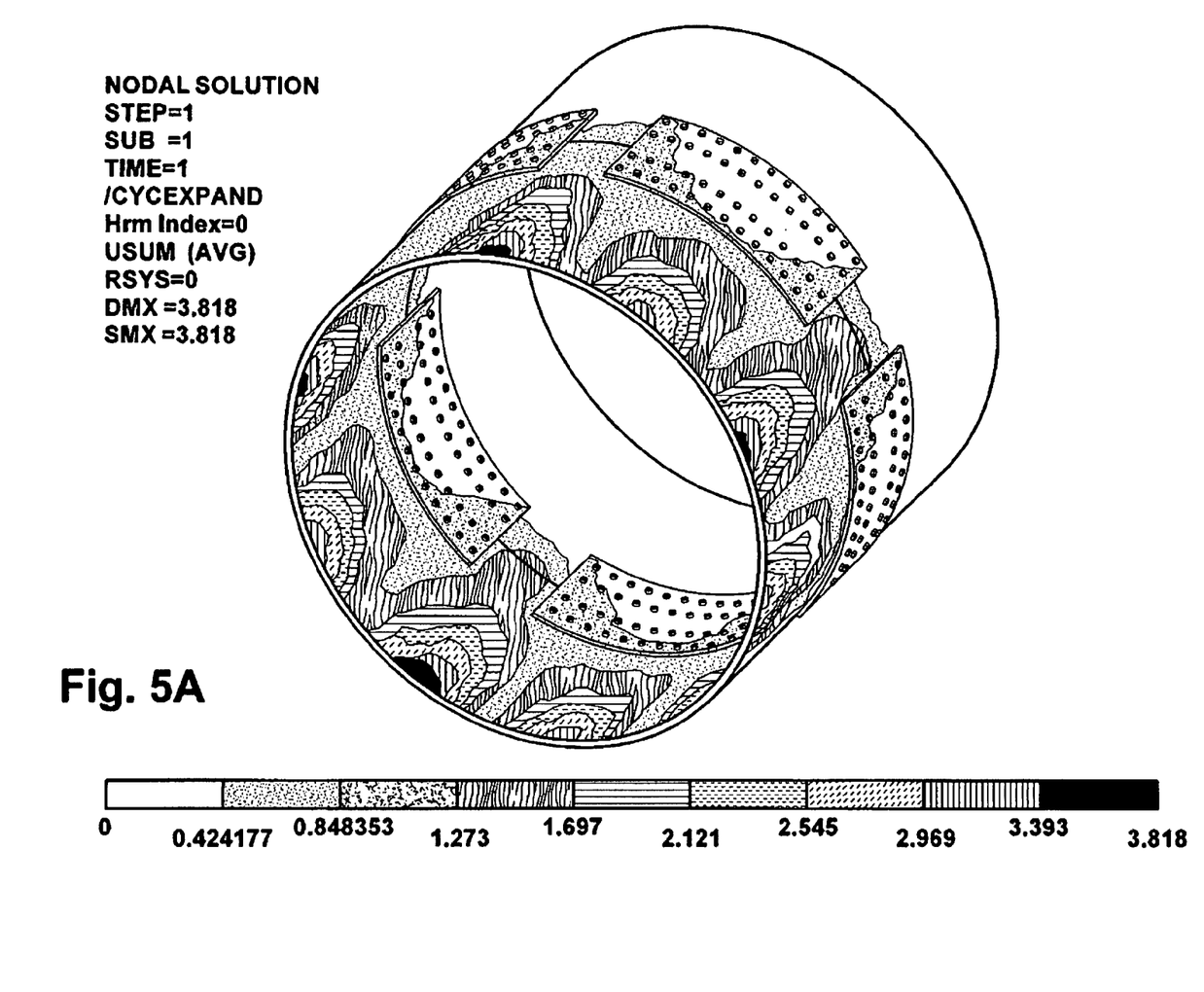
FIG. 5A illustrates resultant distortion for a flangeless wind turbine tower with five fingerplates and a nominal intercan spacing of about 1.5 mm.
Figure 5B:
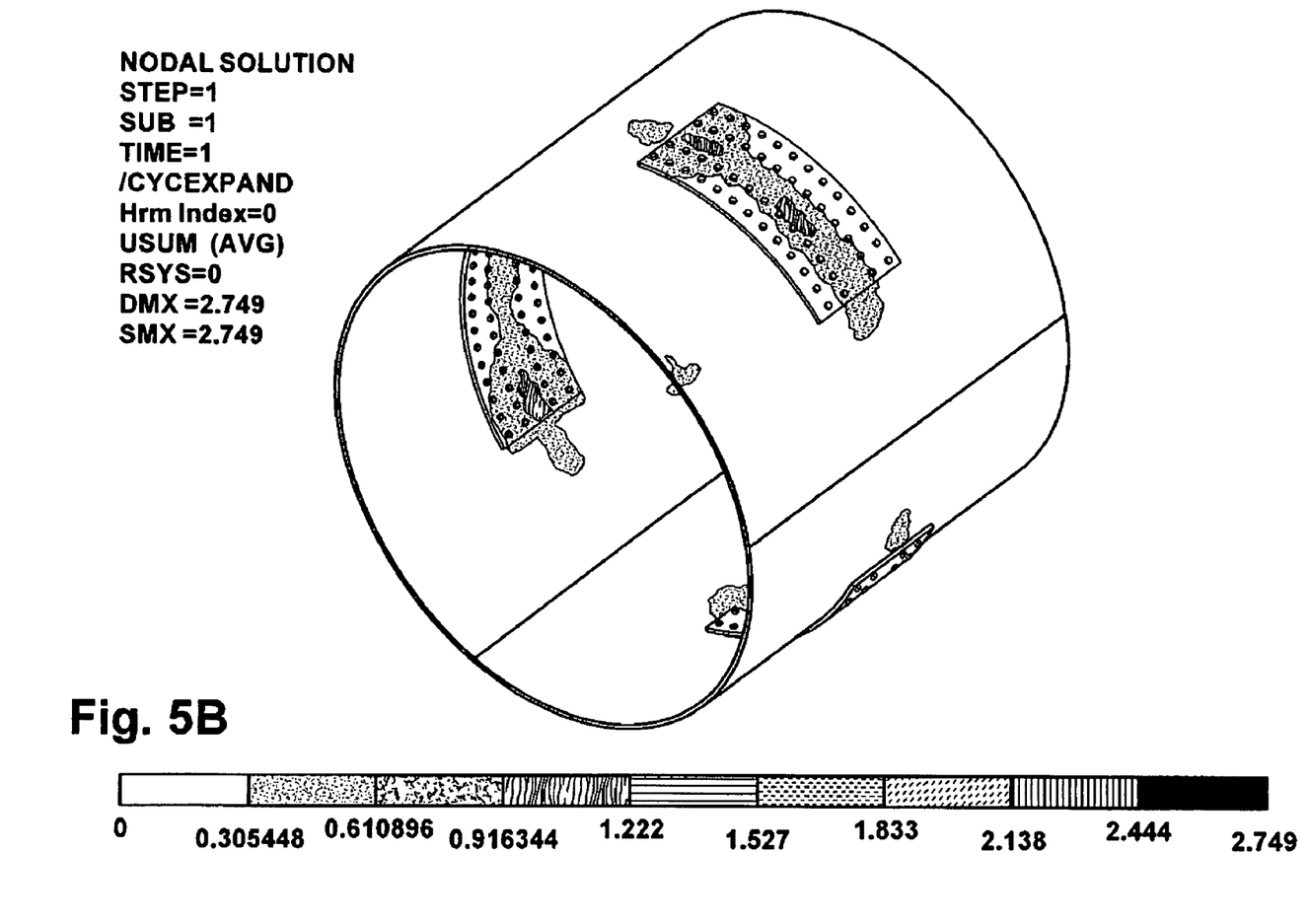
FIG. 5B illustrates resultant distortion for an embodiment of the inventive flangeless wind turbine tower arrangement with three fingerplates and a tightened intercan spacing approaching 0 mm.

It was also discovered that the intercan distance has a significant influence in stiffening the fingerplate design when the tower is subjected to sideway loads. As the intercan spacing decreased from 3 to 0 mm, the stiffening effect is significantly improved. As the intercan spacing approached 0 mm, which is the ideal hypothetical case, the stiffness approached the baseline case. FIG. 5A illustrates resultant distortion for a flangeless wind turbine tower with five fingerplates and a nominal intercan spacing of about 1.5 mm. FIG. 5B illustrates that comparable and satisfactory resultant local distortion can be achieved for the embodiment of the inventive flangeless wind turbine tower arrangement with three fingerplates and a tightened intercan spacing approaching 0 mm.

The increase in the stiffening due to reduced inter can spacing enables a reduction in the number of fingerplates from five fingerplates in Cairo et al. to three fingerplates and get comparable stiffness to the baseline design.

Figure 6:
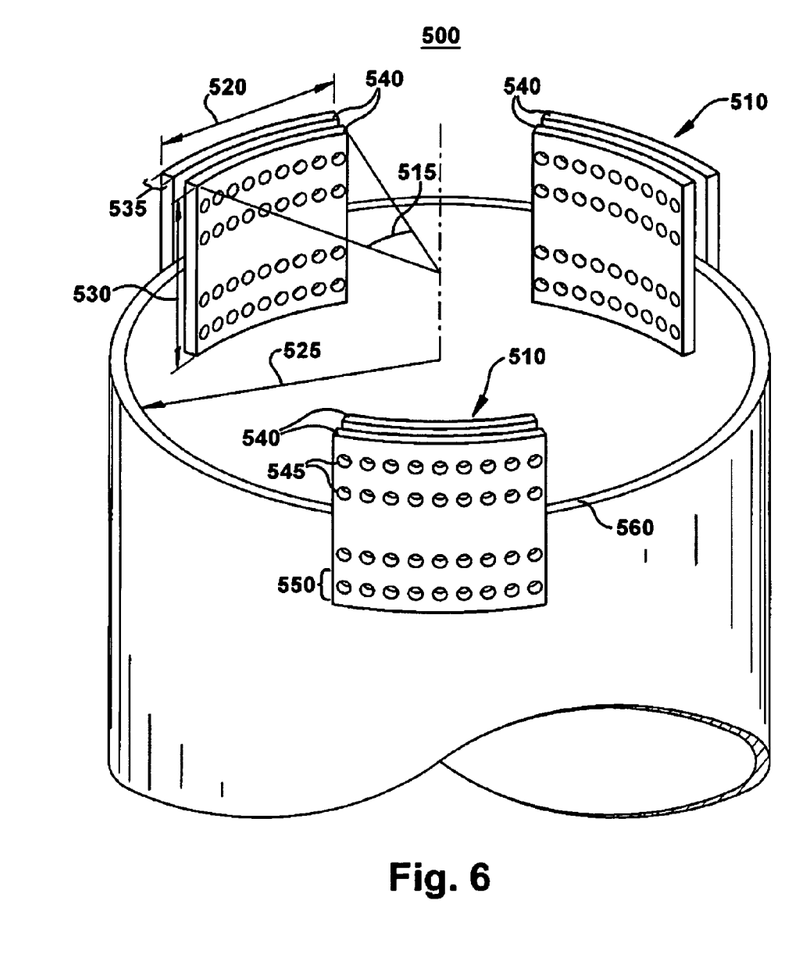
FIG. 6 illustrates an embodiment for the inventive flangeless wind tower joint (upper tower section not shown for clarity) with three fingerplate assemblies and reduced intercan spacing.

FIG. 6 illustrates an inventive flangeless wind tower joint 500 with three fingerplate assemblies 510 and reduced intercan spacing. A lower tower section 560 participating in the joint 500 is shown. The upper tower section of the joint 500 is not shown in order to emphasize the arrangements of the fingerplates in the joint. A geometric volume of the fingerplate for a tower of a given diameter is described by a circumferential angle 515 (equivalent to a circumferential dimension 520 for a specified section radius 525), a longitudinal length 530 and a radial thickness 535 of the fingerplate 540. A baseline fingerplate includes a longitudinal length of about 100 mm, a circumferential dimension of about 2000 mm and a thickness of about 20 mm. The circumferential angle of the fingerplates was found to influence the tower stiffening significantly. As the circumferential dimension decreased and the longitudinal dimension increased in order to maintain volume constancy for the fingerplates, it was observed that the stiffening of the assembly improved. In an arrangement with three fingerplates at each joint, the circumferential angle of about 40 to about 55 degrees provided for enhanced stiffening. The longitudinal dimension could be between 1000-1100 mm. Reducing the circumferential angle (and hence the circumferential dimension) for the fingerplate also has the added benefit of reducing the number of boltholes per row. Based on the iterations 4 bolt rows with 8-10 bolts per row may be utilized to improve stiffening.

The reduction of circumferential dimension also enables an increase in the thickness of the fingerplate to around 40 mm. while keeping the total volume of the fingerplate constant. The thickness dimension significantly enhances increased tower stiffening, and reduction of circumferential dimension enables an in increase the thickness to an optimum level while maintaining a constant volume of fingerplate material.

The Young's modulus of the fingerplate also exercises a significant influence on the total distortion of the wind tower cross-section. As the Young's modulus of the fingerplate is increased considerably above the stiffness for the can material of the tower sections, the plate resists most of the load, thereby causing the can cross-sections to be locally distorted significantly. When the fingerplate has a lower Young's modulus, the fingerplates don't constrain the thinner can sections as much. Thereby the cans were found to have lower total cross-sectional distortions with stiffness comparable to baseline design. However, the top-of-tower (tip) displacement was not found to improve with the higher modulus plate.

A further aspect of the present invention includes use of a coverplate at a top section of the tower. Analysis reveals that utilizing a rigid coverplate on the top tower section may significantly lower tip displacement of the wind tower by maintaining the tower's cross-section (preventing local distortion). Such a coverplate may fit internal to a top tower section at an upper end.

Figure 7:
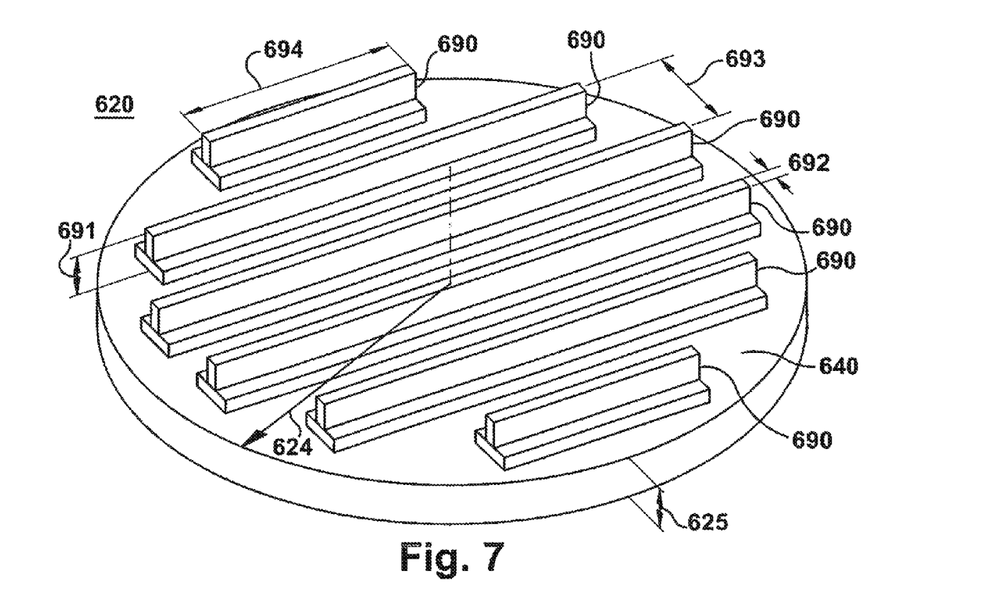
FIG. 7 illustrates an embodiment of a coverplate for stiffening a wind turbine tower.

FIG. 7 illustrates an embodiment of a coverplate for stiffening a wind turbine tower. The coverplate 620 may be solid of a cylindrical or conical geometry based on the tower's cross-section and include a radius 624, equivalent to the inner radius of the tower section. The coverplate 620 may be attached to the top tower section in a variety of ways including with radial bolts extending from the outside of the tower and threaded into holes in the outer radial surface of the coverplate, as shown in FIG. 8.

A lower tip displacement results with the fingerplates made of material with a lower Young's modulus (steel) and the coverplate made of a material with a higher Young's modulus relative to the material used for the tower sections. In effect a coverplate may act as the sacrificial coverplate to transfer most of the load. For example, a coverplate may be attached to the final highest elevation can and may be typically of an axial length 625 of about 300 mm.

The coverplate 620 may further include a plurality of about 5-8 stiffeners 690 across one face 640. The stiffeners 690 may include I beams or H beams of height 691, width 692, with spacing 693, and length 694. The stiffeners 690 may substantially occupy the bottom surface 640 of the coverplate. The stiffeners 690 may be attached to the coverplate by welding or other means known in the all. Use of stiffeners 690 significantly reduces tip displacement for the tower, while at the same time allowing a much reduced coverplate plate axial length 625. For example, with stiffeners applied, an aluminum coverplate of about 20 mm axial length provides significant stiffness so as to reduce tip displacement to about that for the baseline tower.

Figure 8:
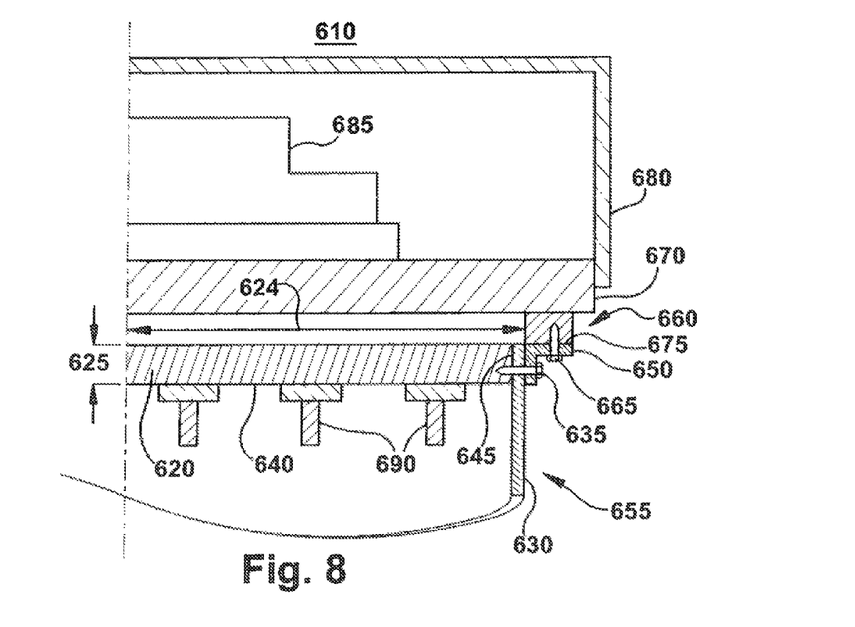
FIG. 8 illustrates an endcover mounted in a top section of the wind turbine tower to limit tip displacement for the tower.

FIG. 8 illustrates an embodiment of an exemplary wind turbine tower 610 including a coverplate 620 attached to the uppermost can 630 within the top section 655 of the wind turbine tower 610 for stiffening. The coverplate 620 includes a radius 624 fitted to an inner radius of the uppermost can 630. The coverplate 620 may include an axial length or thickness 625. An annular circumferential flange 650 may be attached radially to the top end 645 of the upper can 630 by welding or other means known in the art. An upper horizontal face 675 of the circumferential flange 650 may support a yaw bearing 660 with tower-to-yaw bearing fasteners 665. The yaw bearing 660 carries the weight of a bedplate 670, which supports a wind turbine power train 685 within a nacelle 680. The circumferential flange 650 may further include tower-to-coverplate fasteners 635 attaching through the uppermost can 630 and providing vertical support for the coverplate 620.

Figure 9:
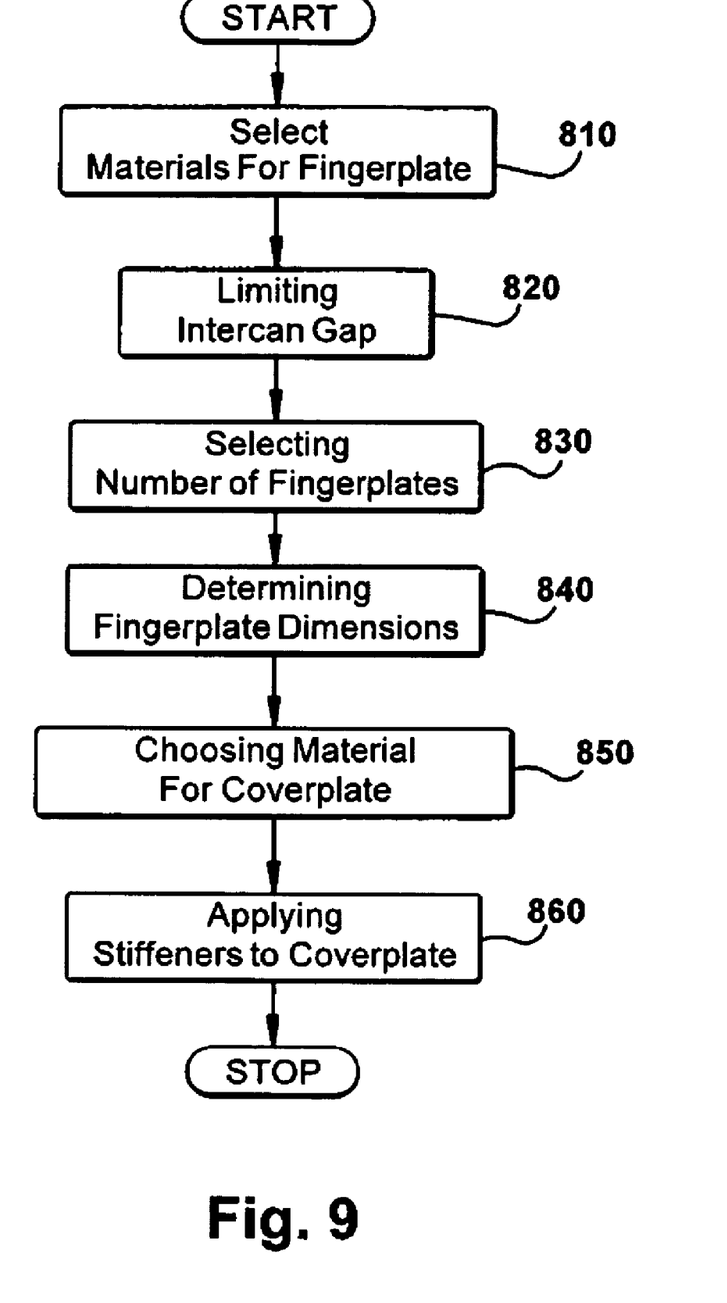
FIG. 9 illustrates a flow chart of a method for limiting local tower can distortion around the fingerplate, improving structural stability (buckling resistance) and stiffening the upper end of the uppermost tower section of flangeless wind turbine tower.

FIG. 9 illustrates a flowchart for a method for stiffening a wind tower, employing fingerplate assemblies on plurality of flangeless joints between a plurality adjacent tubular sections with substantially planar end surfaces. Step 810 selects a material with a Young's modulus for the fingerplate to be lower than a Young's modulus for a material of the tubular section to limit distortion of the tubular sections. Step 820 provides for limiting the intercan gap between adjacent end surfaces of the plurality tower sections at the flangeless joints joined by fingerplate assemblies, which may include limiting intercan gap between about 0 mm to about 3 mm and preferentially to about 0 mm or as close to 0 mm as possible. Step 830 includes selecting a number of fingerplates to fasten each joint of the plurality of flangeless joints which may include selecting a number of fingerplates to fasten each joint that will provide acceptable tower distortion with the limited intercan gaps. Limiting the intercan gap results in improved stiffness of the wind tower allowing the number of fingerplates to be reduced below the five fingerplates of the baseline design. Therefore the step may include selecting three fingerplates to fasten each joint.

Step 840 establishes a circumferential angle (resulting in a circumferential dimension), a longitudinal length and a radial thickness for a fingerplate of the fingerplate assembly. Selecting dimensions for the fingerplate including setting a circumferential angle of about 40 to about 55 degrees, setting a longitudinal dimension of about 1000 mm to about 1100 mm, and setting a radial thickness of about 40 mm. The optimized dimensions minimize tower distortion while maintaining a constant volume of material for the fingerplate. Step 850 mounts a coverplate adapted for stiffening the wind tower to an upper end of a top tubular section. Step 850 may include choosing a material for the fingerplates with a Young's modulus lower than a Young's modulus for a material of the cover plate Step 860 may stiffen the top end of the tower by attaching stiffening members on a surface of the coverplate.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A wind turbine tower comprising:
    a plurality of tubular sections, wherein each tubular section of the plurality of tubular sections includes substantially planar end surfaces defining an intercan gap between adjacent tubular sections, the intercan gap being limited to a predetermined value promoting tower stiffness;
    a plurality of flangeless joints, wherein each individual flangeless joint is arranged between opposing end surfaces of adjacent tubular sections;
    a plurality of fingerplate assemblies uniformly distributed around a periphery of each flangeless joint, wherein each fingerplate includes a circumferential angle, a longitudinal dimension, and a radial thickness; and
    a coverplate attached within a top end of a top tubular section of the plurality of tubular sections, the coverplate defining a radius substantially equal to an inner radius of the top tubular section, the coverplate being formed from a material having a higher Young's modulus than a Young's modulus for a material used to form each of the plurality of fingerplate assemblies.

2. The wind turbine tower according to claim 1, wherein the intercan gap is limited to less than about 3 mm.

3. The wind turbine tower according to claim 1, wherein the intercan gap is limited to less than about 1.0 mm.

4. The wind turbine tower according to claim 1, wherein the intercan gap is limited to less than about 0.5 mm.

5. The wind turbine tower according to claim 4, wherein the intercan gap is limited to approximately 0.0 mm.

6. The wind turbine tower according to claim 1, wherein the plurality of fingerplate assemblies comprises three fingerplate assemblies uniformly distributed around the periphery of each flangeless joint at a circumferential angle of about 40 degrees to 55 degrees, and wherein each of the three fingerplate assemblies uniformly distributed around the periphery of each flangeless joint has a designated longitudinal dimension of approximately 1000 mm to 1100 mm, and wherein a radial thickness of the fingerplate assemblies is approximately 40 mm.

7. The wind turbine tower according to claim 6, wherein each of the three fingerplate assemblies uniformly distributed around the periphery of each flangeless joint comprises: four bolt rows including approximately eight bolts to ten bolts per bolt row.

8. The wind turbine tower according to claim 6, wherein each of the three fingerplate assemblies uniformly distributed around the periphery of each flangeless joint is formed from a material having a Young's modulus lower than a Young's modulus for a material used to form each of the plurality of tubular sections.

9. The wind turbine tower according to claim 1, wherein the coverplate comprises at least one backing stiffener.

10. The wind tower according to claim 9, wherein the at least one backing stiffener is attached to a bottom surface of the coverplate.

11. The wind tower according to claim 10, further comprising a plurality of backing stiffeners, the plurality of backing stiffeners being attached to the bottom surface so as to substantially occupy the entire bottom surface.

12. The wind tower according to claim 9, wherein the at least one backing stiffener is configured as at least one of an I-beam or an H-beam.

13. The wind tower according to claim 1, wherein the intercan gap is limited to less than about 1.5 mm.

14. The wind tower according to claim 1, wherein the coverplate has a cylindrical geometry or a conical geometry.

15. The wind tower according to claim 1, wherein the coverplate defines a plurality of holes configured to receive a plurality of fasteners.

16. The wind tower according to claim 15, further comprising an annular flange attached to the top end of the top tubular section, the plurality of fasteners extending through the annular flange and into the plurality of holes defined in the coverplate.

17. A wind turbine tower comprising:
- a plurality of tubular sections, wherein each tubular section of the plurality of tubular sections includes substantially planar end surfaces forming an intercan gap between adjacent tubular sections, the intercan gap being limited to a predetermined value promoting tower stiffness;
- a plurality of flangeless joints, wherein each individual flangeless joint is arranged between opposing end surfaces of adjacent tubular sections;
- a plurality of fingerplate assemblies uniformly distributed around a periphery of each flangeless joint, each of the plurality of the fingerplate assemblies including a circumferential angle, a longitudinal length and a radial thickness, each of the plurality of fingerplate assemblies being formed from a material with a Young's modulus lower than a Young's modulus for a material used to form each of the plurality of tubular section; and
- a coverplate attached within a top end of a top tubular section of the plurality of tubular sections, the coverplate defining a radius substantially equal to an inner radius of the top tubular section, wherein the coverplate is formed from a material with a high Young's modulus relative to the Young's modulus for the material used to form each of the plurality of fingerplate assemblies.

* * * * *